US011829662B2

(12) United States Patent
Kalwani et al.

(10) Patent No.: US 11,829,662 B2
(45) Date of Patent: Nov. 28, 2023

(54) IMAGE RENDERING BASED ON LOCATION IDENTIFIERS

(71) Applicant: Hewlett-Packard Development Company, L.P., Spring, TX (US)

(72) Inventors: Manohar Lal Kalwani, Pune (IN); Abhishek Ghosh, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/577,693

(22) Filed: Jan. 18, 2022

(65) Prior Publication Data

US 2023/0117819 A1 Apr. 20, 2023

(30) Foreign Application Priority Data

Oct. 14, 2021 (IN) .............................. 202121046997

(51) Int. Cl.
*G06F 3/12* (2006.01)
*G06V 40/16* (2022.01)
*G06V 40/50* (2022.01)
*G06F 21/62* (2013.01)

(52) U.S. Cl.
CPC .......... *G06F 3/1238* (2013.01); *G06F 3/1222* (2013.01); *G06F 21/6245* (2013.01); *G06V 40/161* (2022.01); *G06V 40/172* (2022.01); *G06V 40/50* (2022.01)

(58) Field of Classification Search
None
See application file for complete search history.

(56) References Cited

U.S. PATENT DOCUMENTS

| 8,630,956 B2 | 1/2014 | Arisawa | |
| 8,744,143 B2 | 6/2014 | Chen | |
| 8,826,458 B2 | 9/2014 | Arisawa | |
| 2012/0250951 A1* | 10/2012 | Chen | G06Q 50/01 382/118 |
| 2014/0351324 A1 | 11/2014 | Arisawa | |
| 2016/0171244 A1* | 6/2016 | Ur | G06F 21/6254 726/28 |
| 2019/0190895 A1 | 6/2019 | Adams | |

\* cited by examiner

*Primary Examiner* — Andrew H Lam
(74) *Attorney, Agent, or Firm* — Knobbe, Martens, Olson & Bear, LLP

(57) ABSTRACT

Techniques for providing location identifiers of devices to render image data comprising faces are described. According to an example of the present subject matter, a face present in image data is detected. A contact identifier corresponding to the face is obtained and a location identifier of a device to render image data is sent to the contact identifier.

6 Claims, 7 Drawing Sheets

IMAGE RENDERING BASED ON LOCATION IDENTIFIERS

BACKGROUND

A wide variety of user devices, varying from desktops to mobile phones, comprise cameras to capture images, such as photographs of an individual. Imaging devices, such as printers, scanners, and photocopiers enable reproduction and rendering of a captured image on a compatible medium on receiving a job from a user device.

For instance, a scanner may generate an electronic copy of a photograph on receiving a scan job from a user device. The electronic copy may be made accessible for distribution to a number of user devices.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
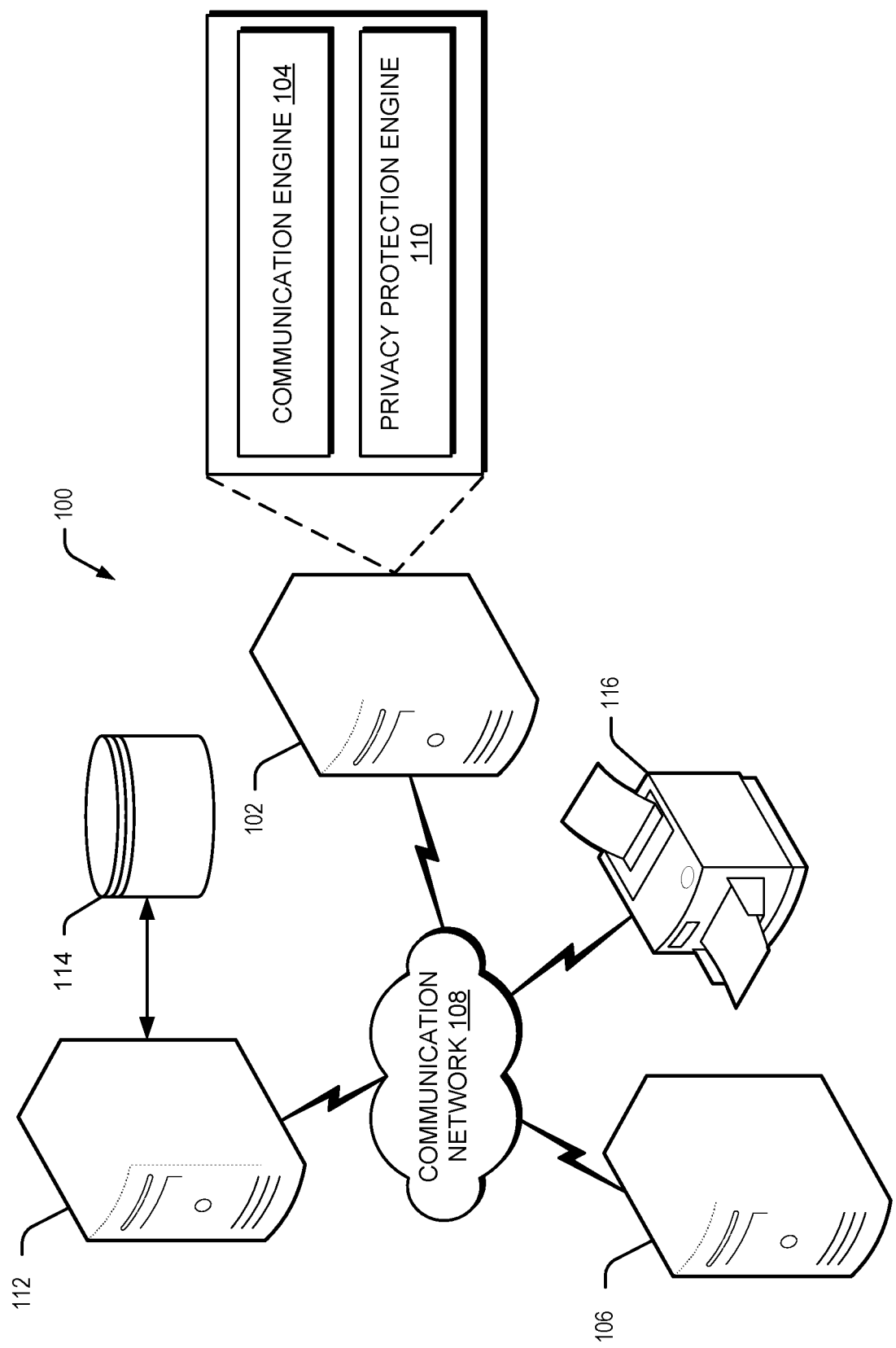
FIG. 1 illustrates a network environment implementing an electronic device to provide a location identifier of a destination device that is to use an image comprising a face of a user to a contact identifier associated with the user, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description, however, the description is not limited to the examples provided in the drawings.

DETAILED DESCRIPTION

Facial image of an individual may be included on a variety of documents, such as a passport, driver's license, or job application. Images comprising a face of a person may also be available in electronic form in a variety of electronic devices, such as a user device that may executed social media applications or an employee database of the person's organization. These images may be reproduced, shared, displayed, or otherwise used by a party having access to the images. An unauthorized use of such images, without the knowledge of the individual, may put his privacy at stake.

In accordance with examples of the present subject matter, techniques for privacy protection in cases of unauthorized use of facial images of individuals are described. In an example, an electronic device comprising a communication engine and a privacy protection engine is described. As used herein, an engine may be implemented as hardware (e.g., circuitry, processor, microprocessor, etc.), computer-readable instructions, or a combination thereof to implement certain functionalities in the electronic device. Among other capabilities, the communication engine and privacy protection engine may be configured to fetch and execute computer-readable instructions stored in a memory of the electronic device.

The communication engine may receive image data to be rendered at a destination device. For instance, the electronic device may be a print server that may receive image data to be printed by a printer or an email server that may receive image data to be displayed by an email client executing on a mobile device. The communication engine may detect the image data to include a face. In an event of the communication engine detecting a face in the image data, the privacy protection engine obtains a contact identifier of a user corresponding to the face detected in the image data. The privacy protection engine sends a location identifier of the destination device to the contact identifier. Accordingly, the user is notified of an attempt to use his facial image at the location of the destination device and the user may take a corresponding action for prevention of the same if he believes the use of his facial image by the destination device may potentially violate his privacy.

The present techniques comprising providing location identifier of the destination device notify the user of an unauthorized use of his facial image, and also enable the user to make an assessment as to the allowability of the use, and accordingly take a corresponding action to allow or prevent the use of his image. For instance, if the location identifier of the destination device indicates the destination device to be present at a location where the destination device may be accessible to authorized parties alone, the user may consent to the use. In one example, the user may not initiate any action for prevention of scanning of his facial image at a scanner located at the human resources department of his organization as opposed to a scanner located at a publicly accessible kiosk.

The above techniques are further described with reference to FIG. 1 to FIG. 6. It should be noted that the description and the figures merely illustrate the principles of the present subject matter along with examples described herein and should not be construed as limiting the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a network environment 100 implementing an electronic device 102 to provide a location identifier of a device that is to use an image comprising a face of a user to a contact identifier associated with the user, according to an example of the present subject matter. The electronic device 102 may be a device capable of receiving or generating image data in electronic form. Examples of the electronic device 102 may include but are not limited to, computing devices, such as desktop computers, personal computers, laptops, smartphones, personal digital assistants (PDAs), and tablets; imaging devices, such as plotters, printers, scanners, digital senders, single function printer (SFP), multi-function printer (MFP), and photocopiers; and other user devices, such as digital cameras, and digital photo displays.

A communication engine 104 of the electronic device 102 may receive image data to be processed by a device. The device, depicted as destination device 106 in FIG. 1, may be a device that may share, display, rendered or reproduce, for instance, by printing or scanning, or otherwise process the image data. Alike the electronic device 102, examples of the destination device 106 may also include but are not limited to, computing devices, such as desktop computers, personal computers, laptops, smartphones, personal digital assistants (PDAs), and tablets; imaging devices, such as plotters, printers, scanners, digital senders, single function printer (SFP), multi-function printer (MFP), and photocopiers; and other user devices, such as digital cameras, digital photo displays.

In an example, the electronic device 102 may communicate with the destination device 106 over a network 108 to provide the image data to the destination device 106. The network 108 may be a single network or a combination of multiple networks and may use a variety of different communication protocols. The network 108 may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), Public Switched Telephone Network (PSTN). Depending on the technology, the communication network 108 includes various network entities, such as gateways, routers; however, such details have been omitted for sake of brevity of the present description.

Though not depicted in FIG. 1, in some examples, the electronic device 102 may receive and render image data thereby acting as the destination device 106. For instance, electronic devices 102, such as printers that may receive image data for printing or personal computers receiving image data for displaying may serve as destination devices 106 as well.

The image data received by the communication engine 104 may comprise a facial image. For instance, the image data may be a photograph of an individual or a group of individuals or a document, such as a passport, a portion of which comprises a facial image of an individual along with or without other contents. If the image data is determined to include a face, a privacy protection engine 110 of the electronic device 102 may be invoked.

The privacy protection engine 110 may obtain a contact identifier of a user corresponding to the face. The contact identifier associated with the user may be a phone number, fax number, email address, etc. of the user or a person associated with him, that may be used to provide a notification, for example, by way of an email, call, SMS, fax or push notification.

In an example, the privacy protection engine 110 may provide the image data or a portion of the image data corresponding to the detected face to a user identification system 112 and receive the contact identifier from the user identification system 112. The user identification system 112 may comprise information that may enable the identification of a user based on image data corresponding to the user's face. In an example, the user identification system 112 may comprise a database 114 of face descriptors pertaining to a number of individuals whose facial images may have been made available to the user identification system 112. Once the user is identified, the privacy protection engine 110 may obtain the contact identifier associated with the user. Examples of sources of contact identifier may be the user identification system 112 or other sources, such as a social media account of the user or an online directory.

In some cases, the privacy protection engine 110 may obtain the contact identifier of the user corresponding to the face from a source internal to the electronic device 102. For instance, there may be several users registered with the electronic device 102, for example, to be authorized to use the electronic device 102. The privacy protection engine 110 may identify a user whose face is present in the image data from amongst the registered users and retrieve the contact identifier associated with the identified user.

Upon obtaining the contact identifier of the user corresponding to the face, the privacy protection engine 110 sends a location identifier of the destination device 106 to the contact identifier. The location identifier may be indicative of a location of the destination device 106 and, for example, may indicate parties to whom the destination device 106 is accessible. In an example, the location identifier is a serial number of the destination device 106, a device name of the destination device 106, an internet protocol (IP) address of the destination device 106, a current location of the destination device 106, or a combination thereof.

Based on the location identifier of the destination device 106 received at the contact identifier, the user or the person associated with the contact identifier is notified of an attempt to use a user's facial image at the destination device 106. Also, the user or the person associated with the contact identifier is notified of a time instance at which said attempt may have been made. For example, a time of receipt of location identifier of the destination device 106 at the contact identifier may be the time at which said attempt is made. In other example, a notification providing the location identifier of the destination device 106 to the contact identifier may mention the time. The user or associated person may initiate an action to allow or prevent said use. For instance, an administrator of the destination device 106 may be asked to halt operation of the destination device 106 or authorities may be notified of unauthorized use of the facial image at the location of the destination device 106.

Thus, the present subject matter enables use of a facial image to be allowed or denied based on the location identifier of the destination device 106. For instance, the location identifier of the destination device may be indicative of the destination device being accessible to a party authorized by the user or a statutory authority. Accordingly, the user may assess the purpose of the use of his image being fraudulent or otherwise.

In an example, the privacy protection engine 110 may also obtain privacy instructions associated with the contact identifier and use the image data based on privacy instructions. For the purpose, privacy instructions for reproduction, rendering, sharing, or displaying of the image may be predefined and made retrievable based on the contact identifier. The privacy instructions may provide rules for use or modification of image data being used by a destination device 106. For instance, the privacy instructions comprise rules for allowing or denying rendering of the image data comprising the facial image. In an example, the rules may provide for allowing rendering of the image data comprising the facial image with modifications, such as a portion of a rendered image corresponding to the face of the user being pixelated.

Accordingly, in an example, the privacy protection engine 110 may cause the reproduction, rendering, sharing, or displaying of the image data in accordance with the privacy instructions associated with the contact identifier. For instance, based on the privacy instructions, the privacy protection engine 110 may cause obfuscation of a face of a user in a document being printed, for example, by altering the image data or by instructing the destination device 106 to do so.

In an example, the privacy instructions may be based on the location identifier of the destination device 106. For instance, the privacy instructions applicable for a first destination device 106 which, based on the location identifier, is determined to be accessible to parties authorized by a user, may differ from those applicable for a second destination device 116 that may be publicly accessible.

Figure 2:
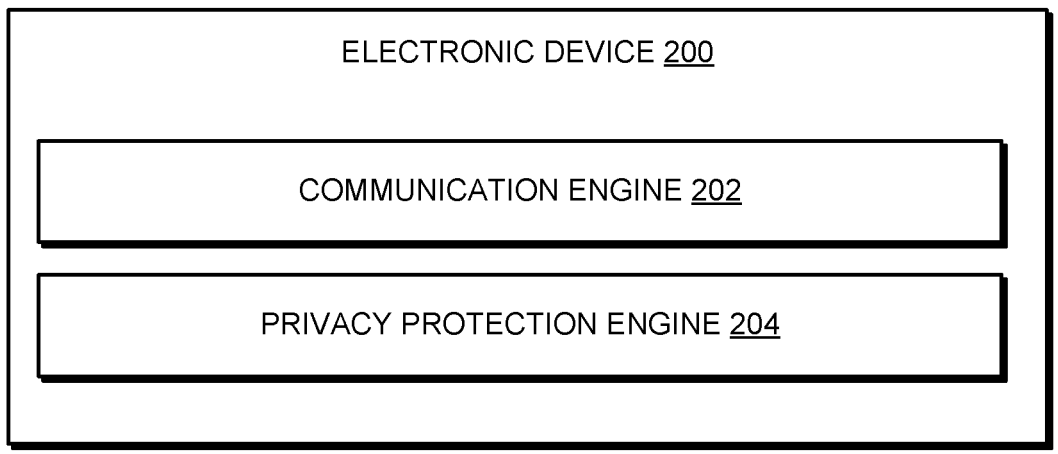
FIG. 2 illustrates an electronic device to send a location identifier of a destination device that is to render an image comprising a face to a contact identifier associated with the face, in accordance with an example.

FIG. 2 illustrates an electronic device 200 to send a location identifier of a destination device (not shown in FIG. 2) that is to render an image comprising a face to a contact identifier associated with the face, in accordance with an example of the present subject matter.

A communication engine 202 of the electronic device 200 may receive image data to be rendered at the destination device. Examples of the electronic device 200 may be: a printer, wherein a communication engine 202 of the printer may receive the image data to be printed from a computing device; a scanner that may generate image data by scanning a physical document, wherein a communication engine 202 of the scanner may receive the image data to render an electronic version of the physical document; and a mobile communication device, wherein a communication engine 202 of the digital camera may receive image data for displaying on a screen of the mobile communication device. As explained above, the destination device may be the electronic device 200 or another device communicatively coupled to the electronic device 200.

The image data received by the communication engine 202 may include, inter alia, a face. In an example, a privacy protection engine 204, coupled to the communication engine 202, is operable to obtain a contact identifier of a user corresponding to the face and send a location identifier of the destination device to the contact identifier. In an example, the privacy protection engine 204 may generate a notification comprising the location identifier of the destination device and send the same to the contact identifier. The notification, in an example, may additionally comprise details pertaining to the image data to be rendered, such as a name of a document to be rendered. In a similar example, the image data received by the communication engine 202 to be rendered may have an associated document name. The associated document name may be included in the notification.

In an example, the communication engine 202 and privacy protection engine 204 may be implemented as a combination of hardware and programming (for example, programmable instructions) to implement certain functionalities in the electronic device 200. In the examples described herein, such combinations of hardware and programming may be implemented in several different ways. Among other capabilities, the communication engine 202 and privacy protection engine 204 may be configured to fetch and execute computer-readable instructions stored in a memory (not shown in FIG. 2) of the electronic device 200.

In operation, when the image data received by the communication engine 202 is detected to comprise a face, the privacy protection engine 204 is triggered to notify the user with regard to receipt of the image data comprising the user's face for being rendered at the location of the destination device.

Figure 3:
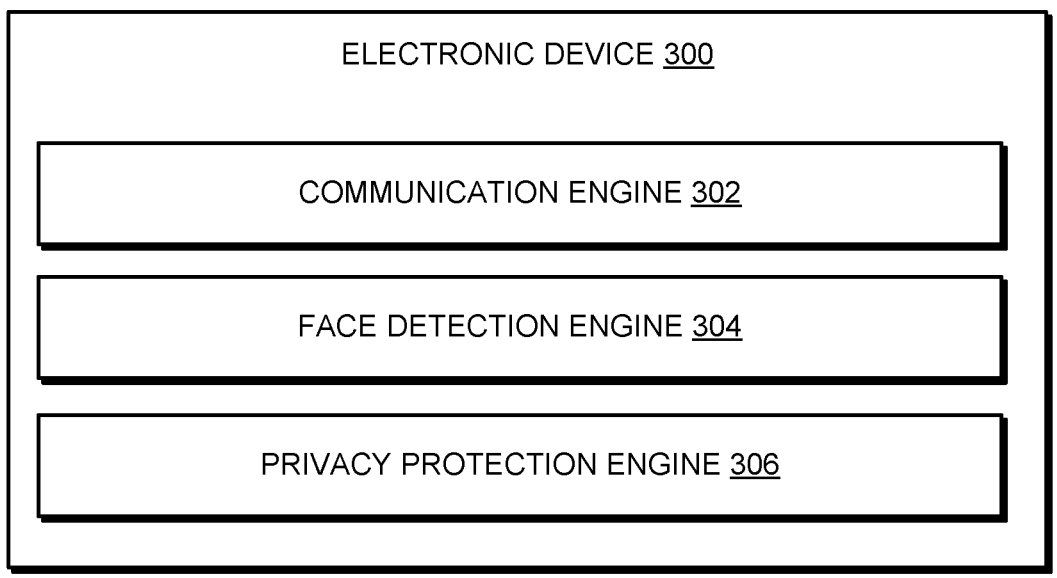
FIG. 3 illustrates an electronic device to send job information comprising a location identifier of the electronic device to a contact identifier, in accordance with another example.

In some examples, the electronic device 200 may be an imaging device that may receive, process or generate image data to render the same on a compatible medium. Reference is made to FIG. 3 to describe privacy protection of image data comprising facial images in such examples.

FIG. 3. illustrates an electronic device 300 to send job information comprising a location identifier of the electronic device 300 to a contact identifier, in accordance with another example of the present subject matter. As mentioned above, the electronic device 300 may be an imaging device, such as a printer, e.g., single function printer (SFP), multi-function printer (MFP), plotter, scanner, or photocopier, for example, that may enable reproduction and rendering of image data on a compatible medium on receiving a job from a user device.

A communication engine 302 of the electronic device 300 may receive a job to reproduce an image. The job may, for example, be understood as a command provided to an imaging device for reproducing an image, for instance by printing, scanning or photocopying. The job may include instructions for reproduction of the image, such as a page layout or resolution of the reproduced image. The job may be indicative of image data to be reproduced or comprise the image data to be reproduced. For instance, a print job may include image data to be printed or a location of the image data to be printed. Accordingly, the communication engine 302 may retrieve the image data corresponding to the job.

In an example, a face detection engine 304, coupled to the communication engine 302, may be operable to detect a face present in the image to be reproduced. The face detection engine 304 may analyze the image data of the image to determine the presence of a human face. For instance, to determine the presence of the face, the face detection engine 304 may implement face detection techniques. In an example, the face detection engine 304 may use Haar face detection method.

A privacy protection engine 306, coupled to the face detection engine 304 may be operable to identify the detected face by determining an identity of a person whose face is included in the image to be reproduced. In an example, to identify the person, the privacy protection engine 306 may coordinate with an identification system, such as the user identification system 112 that may enable identification of a person based on image data corresponding to the person's face. The privacy protection engine 306 may provide image data corresponding to the detected face to the user identification system 112 and may receive in response, an identity of the person whose face is included in the image.

In some cases, the privacy protection engine 306 may implement techniques to determine the identity of the person whose face is included in the image data that may be independent of the identification system. For example, the privacy protection engine 306 may identify the person whose face is included in the image data from amongst users registered with the electronic device 300. For instance, the electronic device 300 may be accessible to several users, such as a computing or imaging device shared by employees of an organization. Each of the several users may register with the electronic device 300 by providing their respective facial images to the electronic device 300. Based on the images of the faces of the users obtained to register them, the privacy protection engine 306 may identify a registered user whose face is present in the image data.

Once the identity of the person is determined, the privacy protection engine 306 may obtain a contact identifier associated with the face. The contact identifier may be provided by the user, for example, during the registration process, and may be retrieved by the privacy protection engine 306. In other examples, the privacy protection engine 306 may obtain the contact identifier from other sources such as a public directory or an employee database.

After having obtained the contact identifier associated with the person, the privacy protection engine 306 may send job information corresponding to the job to the contact identifier. The job information may comprise details pertaining to the job, such as the name of a document being printed or a number of pages being copied along with a location identifier of the electronic device 300 so as to notify the person that his image may be reproduced by the electronic device 300. In an example, the job information may comprise a time of receipt of the job to reproduce the image at the electronic device 300. Further, in an example, the privacy protection engine 306 may cause completion of the job in accordance with privacy instructions associated with the contact identifier. The privacy instructions comprise rules for modification of the image to be reproduced based on the job information, as elaborated subsequently.

Figure 4:
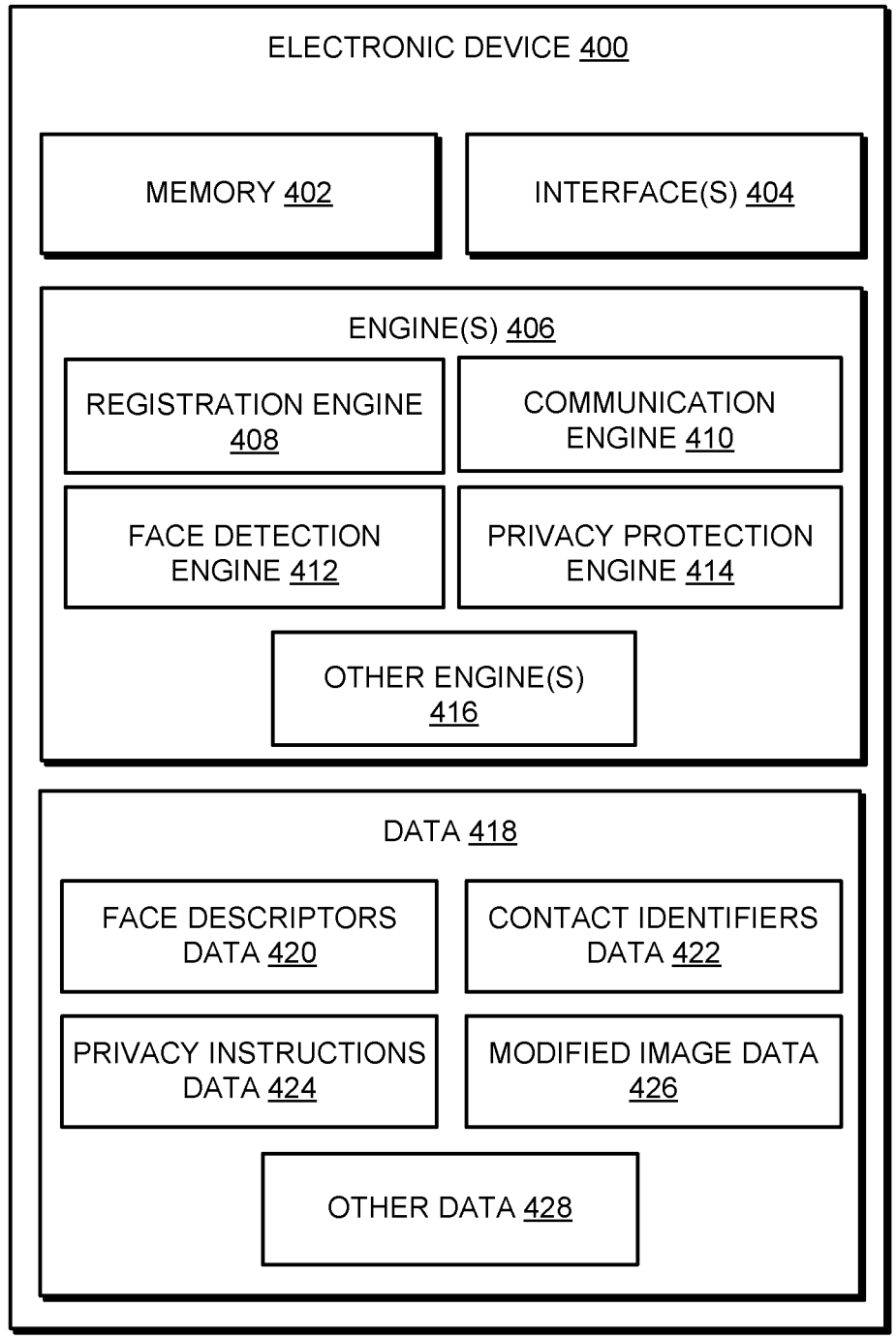
FIG. 4 illustrates an electronic device to provide a location identifier of a destination device that is to render a facial image of a user to a contact identifier corresponding to the user, according to an example.

Reference is now made to FIG. 4 that illustrates an electronic device 400 to provide a location identifier of a destination device (not shown in FIG. 4) that is to render a facial image of a user to a contact identifier corresponding to the user, according to an example of the present subject matter. Examples of electronic devices 400 include servers, desktop computers, laptops, and smartphones.

The electronic device 400, among other things, includes and a memory 402, interface(s) 404, and engine(s) 406. The memory 402 may include any computer-readable medium including, for example, volatile memory (e.g., RAM), and/or non-volatile memory (e.g., EPROM, flash memory, etc.). The interface 404 may include a variety of software and hardware interfaces that allow the electronic device 400 to interact with other devices, such as the destination device or other input/output (I/O) devices that may be used to provide inputs, such as image data to the electronic device 400.

The engine(s) 406 may be implemented as a combination of hardware and programming (for example, programmable instructions) to implement certain functionalities of the engine(s) 406. In the examples described herein, such combinations of hardware and programming may be implemented in several different ways. For example, the programming for the engine(s) 406 may be processor-executable instructions stored on a non-transitory computer-readable storage medium, and the hardware for the engine(s) 406 may include a processing resource (for example, implemented as either a single processor or a combination of multiple processors), to execute such instructions. In the present examples, the computer-readable storage medium may store instructions that, when executed by the processing resource, implement engine(s) 406. In such examples, the electronic device 400 may include the computer-readable storage medium storing the instructions and the processing resource to execute the instructions, or the computer-readable storage medium may be separate but accessible to the electronic device 102 and the processing resource.

In other examples, engine(s) 406 may be implemented by electronic circuitry. The engine(s) 406 may include a registration engine 408, a communication engine 410, a face detection engine 412, and a privacy protection engine 414. In an example, the engine(s) 406 may also comprise other engine(s) 416 that supplement functions of the electronic device 400.

Data 418 of the electronic device 400 serves, amongst other things, as a repository for storing data that may be fetched, processed, received, or generated by the engine(s) 406. In the illustrated example, the data 418 comprises face descriptors data 420, contact identifiers data 422, privacy instructions data 424, and modified image data 426. The data 418 also comprises other data 428 corresponding to the other engine(s) 416.

The registration engine 408 may be operable to register users with the electronic device 400. In an example, the registration engine 408 may perform a registration process to register a user with the electronic device 400. The registration process may involve the user submitting images of his face for registering with the registration engine 408. For the purpose, the registration engine 408 may cause a prompt to be displayed on a display device (not shown) of the electronic device 400 prompting the user to submit images comprising his face. The images may be captured by a built-in camera of the electronic device 400 or a camera coupled to the electronic device 400 or may be retrieved from a source, such as a social media account of the user. Similarly, in some examples, images from a prior registration with the electronic device 400 or another device trusted by the electronic device 400 may be leveraged. In some situations, an authorized person, such as an administrator of an organization may also carry out the registration process to register a user. The authorized person, in one example, may use an image of the user, such as a profile picture of the user included in his profile registered with the organization to register the user.

From the images of the face of a user obtained by the registration engine 408, face descriptors corresponding to the face of the user may be extracted. In an example, the face descriptors may include, but are not limited to, features of a retina, iris, or geometrical features of a face and enable recognition of a user corresponding to the face. The face descriptors corresponding to each of the registered users may be stored as face descriptors data 420 in the data 418 of the electronic device 400.

In the example depicted in FIG. 4, the face descriptors data 420 has been shown to reside internal to electronic device 400. However, examples where the face descriptors data 420 may reside in a database external to the electronic device 400, for example, an external server implemented for registering the users with the electronic device 400, are also possible.

In an example, the registration engine 408 may also obtain a contact identifier corresponding to each of the registered users. For instance, the registration engine 408 may obtain the contact identifier by prompting the user during the registration process. The contact identifier associated with a user may be used to communicate with the user. As mentioned previously, in an example, the contact identifier may be an email address, a mobile number, a fax number, or any other contact number or address which may be used to communicate with the user. The contact identifier may be stored in the contact identifiers data 422 or an external database.

In some examples, in addition to obtaining the contact identifier corresponding to the registered users, the registration engine 408 may also obtain privacy instructions corresponding to the registered users. The privacy instructions may comprise rules, for example, user-defined rules for protecting privacy of a user in events that involve reproduction, rendering, sharing or displaying of image data comprising the face of the user. For example, the privacy instructions may provide for allowing or denying reproduction, rendering, sharing or displaying of the image data or for modifying the image. The privacy instructions may be stored in the privacy instructions data 424 or an external database. In an example, the privacy instructions corresponding to a user may be retrievable based on the contact identifier associated with the user.

In operation, the communication engine 410 may receive image data to be rendered at the destination device. Some examples of destination devices include imaging devices, such as single-function imaging devices like scanners, printers, facsimile devices and photocopying devices or multi-function imaging devices, like a multi-function printer that may incorporate, along with its capability to print content, functionality of a scanner. The destination device may receive the image data to be rendered from the communication engine 410, for example, over a communicating network. Also, as explained previously, in some cases the electronic device 400 may itself be the destination device, such that a rendering engine (not shown) of the electronic device 400 may receive the image data to be rendered from the communication engine 410 via the interface 404. The image data to be rendered may comprise a face of one or more individuals. The face detection engine 412 is operable to determine if the image data comprising a face. In an example, the face detection engine 412 may use OpenCV-based face detection techniques, such as Haar Cascades method to detect the presence of the face in the image data. If the face detection engine 412 detects a face in the image data, further processing for rendering of the image data may be carried out by the privacy protection engine 414 while the privacy protection engine 414 may be bypassed if the image data does not comprise any face.

In an example, the privacy protection engine 414 may pause further processing of the image data to suspend its rendering if the image data comprises a face. In an example, the privacy protection engine 414 may cause the image data to not be queued with the rendering engine or shared with the destination device. Further, the privacy protection engine 414 may obtain a contact identifier of a user corresponding to the face. The contact identifier may be a phone number, fax number, email address, etc., of the user or a person associated with him, such as an administrator of the user's devices.

To obtain the contact identifier, in an example, the privacy protection engine 414 may extract face descriptors of the face from the image data and compare the extracted face descriptors with face descriptors of registered users stored in the face descriptors data 420. Based on the comparison, the privacy protection engine 414 may identify the user corresponding to the face and may obtain the contact identifier of the identified user from the contact identifiers data 422.

In other examples, to obtain the contact identifier, the privacy protection engine 414 may provide image data corresponding to the face or the face descriptors extracted therefrom to a user identification system that may comprise information to enable identification of a user based on the image data corresponding to the user's face. In an example, the user identification system may be the above-mentioned user identification system 112 that may comprise a database 114 of face descriptors of a number of individuals whose facial images may have been provided to the user identification system 112. For a user identified with the assistance of the user identification system, the contact identifier of the user may be procured from a variety of sources, including the user identification system, a public or private directory, and a social media account of the user.

The privacy protection engine 414 may use the contact identifier to provide a notification comprising a location identifier of the destination device for example, by way of an email, call, SMS, fax or push notification to the user or the person associated with him. In an example, the notification may be indicative of a time of use of the image data by the destination device. The privacy protection engine 414 may be aware of the location identifier of the destination device, enquire it from the destination device, or retrieve it from another source. In an example, an electronic device, such as a laptop may be aware of an IP address of a destination device, such as a printer. In another example, based on a command to scan a document, a scanner may determine the network address of a mobile device to which scanned data is to be sent.

The notification may alert the user or the person associated with contact identifier that an image comprising his facial image is to be rendered by the destination device. Also, the location identifier of the electronic device may enable the user to determine if the electronic device is being used by an authorized party. Accordingly, the user may take an action to cause the destination device to be allowed to render the image data or be prevented from doing so. In an example, the action may correspond to providing privacy instructions (explained subsequently) to the privacy protection engine 414.

In an example, the privacy protection engine 414, upon detection of the face in the image data, keeps further processing of the image data suspended to prevent rendering of the image data until a command to continue the processing is received. The command may be based on a user input that may be provided by the user, for example, remotely using a device associated with the contact identifier that received the notification. In another example, the command may be provided to the privacy protection engine 414 by any other device. In yet another example, the command may be provided to the privacy protection engine 414 by an administrator of the electronic device 400. In some examples, a default command to continue the processing, for instance, after lapse of a predetermined time is also possible.

In some examples, the default command may indicate that the further processing of the image data to render the same may continue based on the identity of the user. Accordingly, the default command may indicate that image data pertaining to a first identified user may be rendered even in absence of the user input while that pertaining to a second identified user may not. Similarly, in some examples, the default command may be based on the location identifier of the destination device. Thus, in an example, the default command may enable the image data pertaining to a user to be rendered at a first destination device, which, based on its location identifier is determined to be in a trusted network, as opposed to a second destination device which may be in outside said network.

In cases where the privacy protection engine 414 may continue the further processing of the image data, the image data may be rendered in accordance with the associated privacy instructions. As previously described, privacy instructions may comprise rules for modification of the image data to be rendered by the destination device. In an example, the privacy protection engine 414 may retrieve, from privacy instructions data 424, the privacy instructions corresponding to a user for rendering the image data of the user.

In an example, the privacy protection engine 414 may retrieve the privacy instructions based on the contact identifier associated with the user, for instance. In some examples, the privacy protection engine 414 may receive the privacy instructions from the user. For instance, upon receiving the notification, the user or the person associated with him may communicate with the electronic device 400 to provide privacy instructions to the privacy protection engine 414. In an example, the privacy protection engine 414 may present a set of privacy instructions as options for the user to select and may cause the image data to be rendered in accordance with the selected privacy instructions.

The privacy protection engine 414 may employ a variety of techniques to modify the image data based on the rules of the privacy instructions. For instance, privacy protection engine 414 may cause modification of the image data to obfuscate the face in the reproduced image. In one example, the privacy protection engine 414 may cause blurring or pixelating a portion of the image data corresponding to the user's face. In one example, the privacy protection engine 414 may modify the image data to remove the face from the image data by substituting a portion of the image data containing the face with pixels from other areas of the image data or by superimposing pixels of a predetermined color over such portions, for example. Based on the rules for modification of the image data, in some examples, the modified image data may contain, at least partially, parts of the body of the user corresponding to the face with the face alone obfuscated, while in other examples, the body of the user or parts thereof may be obfuscated.

The image data modified by the privacy protection engine 414 may be stored as modified image data 426 in data 418. The further processing of the image data for rendering may be based on the modified image data 426. For example, image data modified by the privacy protection engine 414 may be retrieved by the rendering engine or the destination device and processed further for completion of the rendering.

Figure 5:
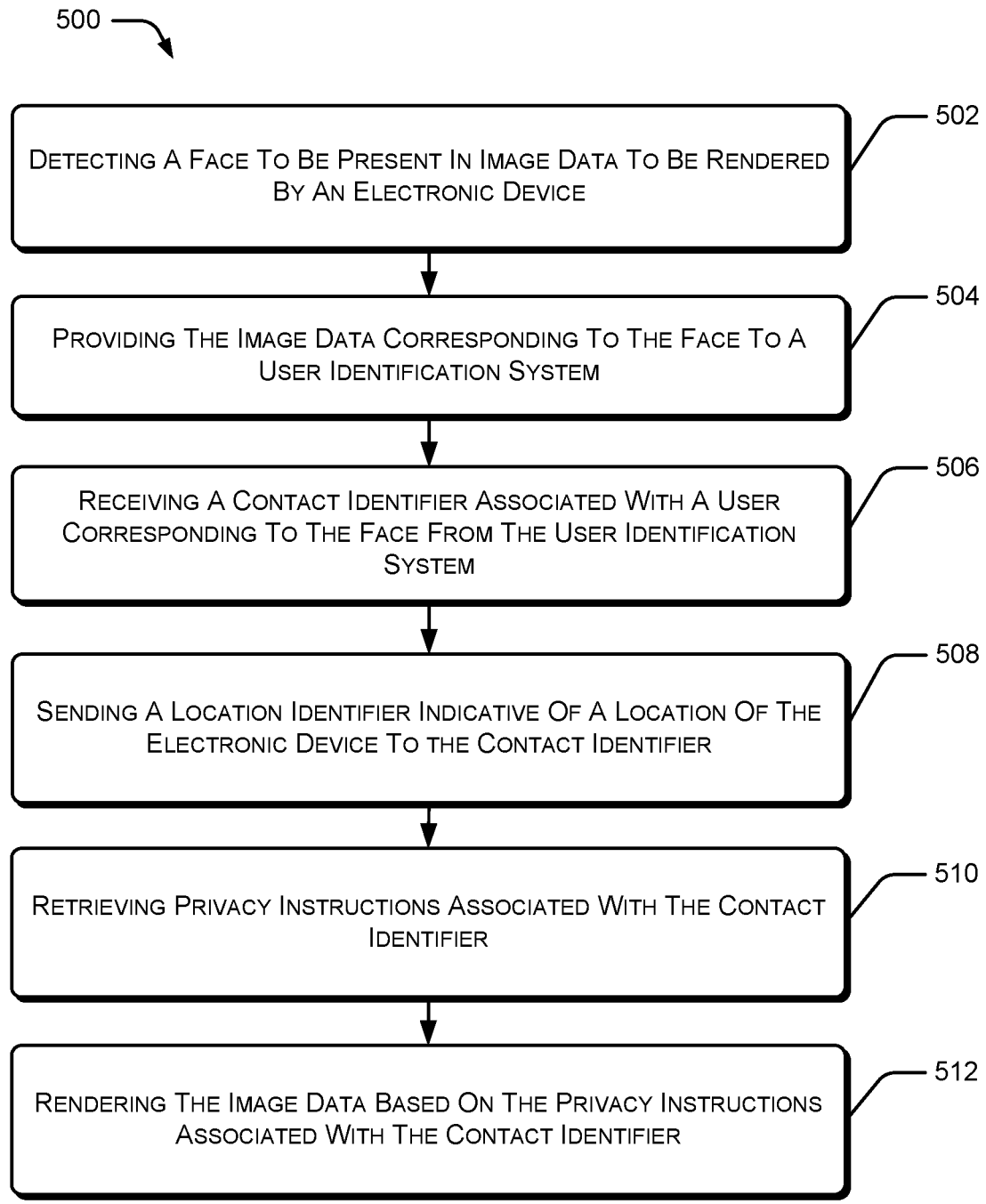
FIG. 5 illustrates a method to provide a location identifier of a destination device that is to render an image comprising a face to a contact identifier associated with a user corresponding to the face, according to an example.

FIG. 5 illustrates a method 500 to provide a location identifier of a destination device that is to render an image comprising a face to a contact identifier associated with a user corresponding to the face, according to an example of the present subject matter.

The order in which the method 500 is described is not intended to be construed as a limitation, and any number of the described method blocks may be combined in any order to implement the method 500, or an alternative method.

It may be understood that blocks of the method 500 may be performed by programmed computing devices. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 5, at block 502, the method 500 comprises detecting a face to be present in an image data to be rendered by an electronic device, such as the electronic device 102, 200, 300, and 400. At block 504, the image data corresponding to the face is provided to a user identification system and in response to the providing, at block 506, a contact identifier associated with a user corresponding to the face is received from the user identification system. As will be apparent based on the foregoing description, the user identification system may implement techniques to identify users based on the image data corresponding to the face of the respective users and may determine contact identifiers corresponding to identified users.

At block 508, the method 500 comprises sending a location identifier indicative of a location of the electronic device to the contact identifier. In an example, the location identifier may be a serial number of the electronic device, a device name of the electronic device, an IP address of the electronic device, a current location of the electronic device, or a combination thereof.

Further, in an example, privacy instructions for rendering the image data may be predefined and associated with the contact identifier. The privacy instructions may comprise rules for modification of the image data prior to the image data being rendered. For example, the privacy instructions may comprise rules instructing the electronic device to modify the image data to obfuscate the face in the rendered image data.

In an example, the privacy instructions may be based on the location identifier of the electronic device. For instance, based on the location identifier indicating the electronic device to be in a network trusted by the user or otherwise, different privacy instructions may be applicable. At block 510, the privacy instructions associated with the contact identifier received at block 504 are retrieved. Accordingly, at block 512, the method 500 comprises causing the electronic device to render the image data based on the privacy instructions.

Figure 6:
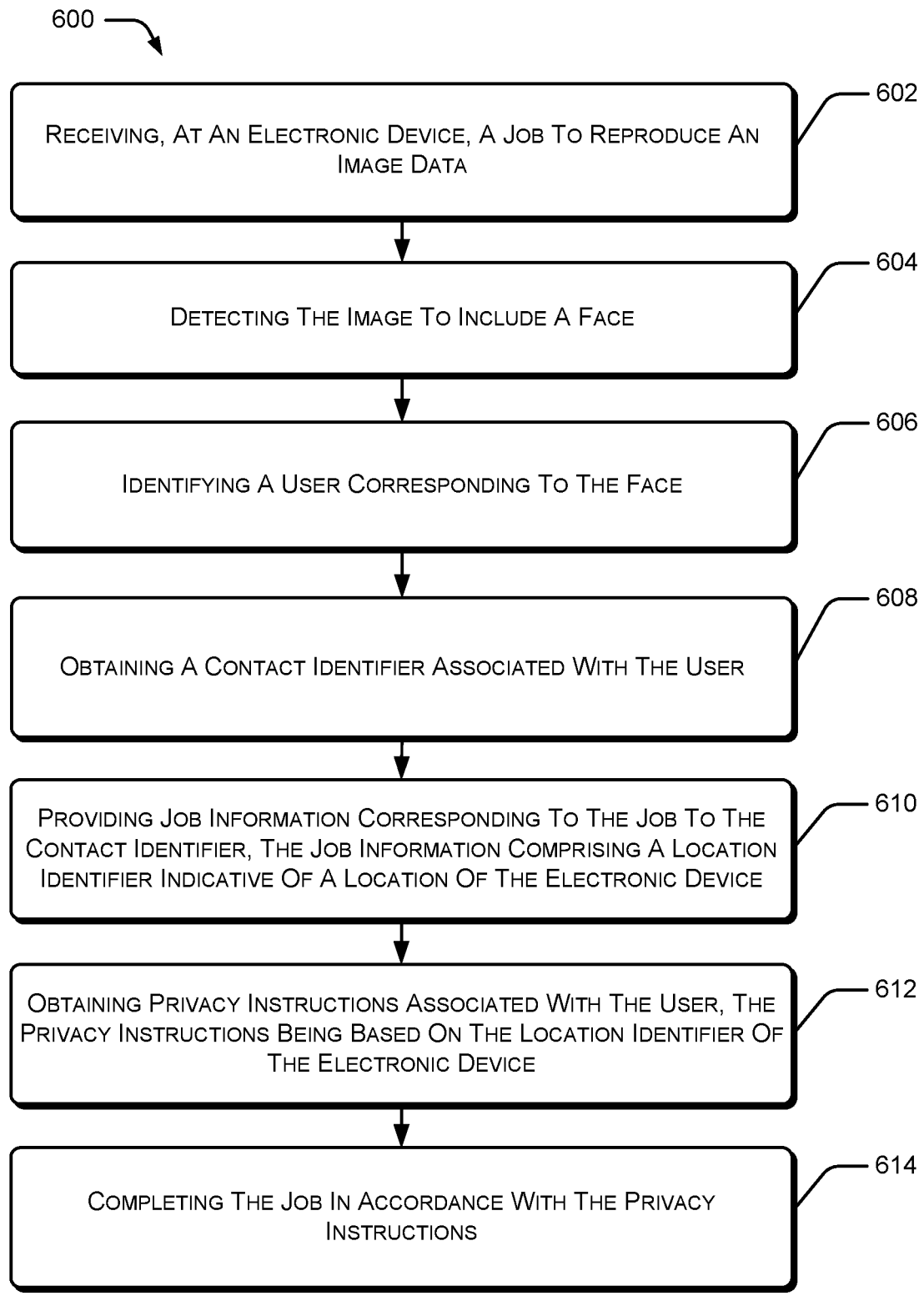
FIG. 6 illustrates a method for image rendering based on location identifiers, according to an example.

FIG. 6 illustrates a method for image rendering based on location identifiers, according to an example.

The order in which the method 600 is described is not intended to be construed as a limitation, and any number of the described method blocks may be combined in any order to implement the method 600, or an alternative method.

It may be understood that blocks of the method 600 may be performed by programmed computing devices. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 6, at block 602, the method 600 comprises receiving, at an electronic device, a job to reproduce image data. The electronic device may be any of the above-described electronic devices 102, 200, 300, or 400. In an example, the electronic device may be an imaging device, such as a printer. On receiving a print job, the printer may print image data corresponding to the print job on paper, thereby reproducing the image data. In an example, the image data corresponding to the print job may be an electronic copy of a document, such as a passport, driver's license, or an employee ID card, comprising a photograph of an individual.

At block 604, the method 600 comprises detecting the image data to include a face. Considering the previous example of the printer provided with a job to print a document, such as an employee ID card, at block 604, a determination is made as to the employee ID card including the face of a person along with textual information. At block 606, the method 600 comprises identifying a user corresponding to the face. Considering the example of the printer to print the employee ID card again, an employee whose face is included in the employee ID card may be identified. In an example, the techniques for face detection and user identification may be similar to those explained above, for instance, in reference to block 502 and block 504 of method 500, respectively. Accordingly, in an example, to identify the employee, a database comprising facial images of various employees of an organization may be consulted.

A contact identifier associated with the identified user is obtained at block 608. Similar to the process of face detection and user identification, the techniques for obtaining the contact identifier associated with the identified user may be based on the examples previously explained. Referring again to the example of the printer to print the employee ID card, the contact identifier of the identified employee may be obtained from a directory of the organization, for example.

At block 610, the method 600 comprises providing job information corresponding to the job to the contact identifier obtained at block 608. The job information comprises a location identifier indicative of a location of the electronic device. The job information may also comprise details pertaining to the job, such as the name of a document to be reproduced, a time of receipt of the job, and the number of copies to be created.

In the context of the above example of the printer, the job information may comprise a location identifier of the printer. The location identifier of the printer may be a serial number of the printer, a device name of the printer, an IP address of the printer, a current location of the printer, or a combination thereof. Accordingly, the job information provided to the contact identifier of the identified employee may include, in an example, a serial number or name of the printer along with other details pertaining to the job, such as the employee ID card number. The job information may serve to notify the employee that his employee ID card may be printed by the printer bearing the serial number or name mentioned in the job information. The serial number or name mentioned in the job information may enable the employee to determine the location of the printer, for example, using a directory having details of imaging devices of the organization.

The determination of the location of the printer may in turn enable the employee to assess if the reproduction of his employee ID card may be allowed. For instance, if the location of the printer indicates that the printer is located in a human resources department of his organization, the employee may assess that the reproduction of his employee ID card may be allowed. In case, the printer is located at a reception of his organization, the employee may take action to prevent the printing of his employee ID card.

In some examples, the employee may have predefined privacy instructions for printing of documents comprising his facial image, such as his employee ID card, based on the location of the printer. For instance, the privacy instructions may allow printers located in the human resources department to print copies of documents comprising his facial image, while preventing printers located at other departments of his organization to print copies of such documents. For example, the privacy instructions may define that a printer, present at a location accessible to persons other than human resources personnel, is to halt its operation upon detecting the face of the employee in a document to be printed and is to make printouts available after an input from the employee is received.

In accordance with such examples, at block 612, the method 600 comprises obtaining privacy instructions associated with the user identified at block 606. As mentioned above, the privacy instructions may be based on the location identifier of the electronic device to reproduce the image data. For example, the privacy instructions may allow electronic devices, that are determined to be located in a trusted network based on their respective IP addresses, to reproduce image data comprising facial images.

The privacy instructions associated with the user may be obtained upon identifying the user. For example, once the user is identified at block 606, the privacy instructions associated with the user may be retrieved. For the employee mentioned in the foregoing example, having identified the employee, the privacy instructions associated with the employee may be retrieved from a database comprising privacy instructions associated with various employees of the organization.

At block 614, the job of reproducing the image data is completed based on the privacy instructions associated with the identified user. The privacy instructions thereby provide for controlling the reproduction of image data comprising facial images.

Figure 7:
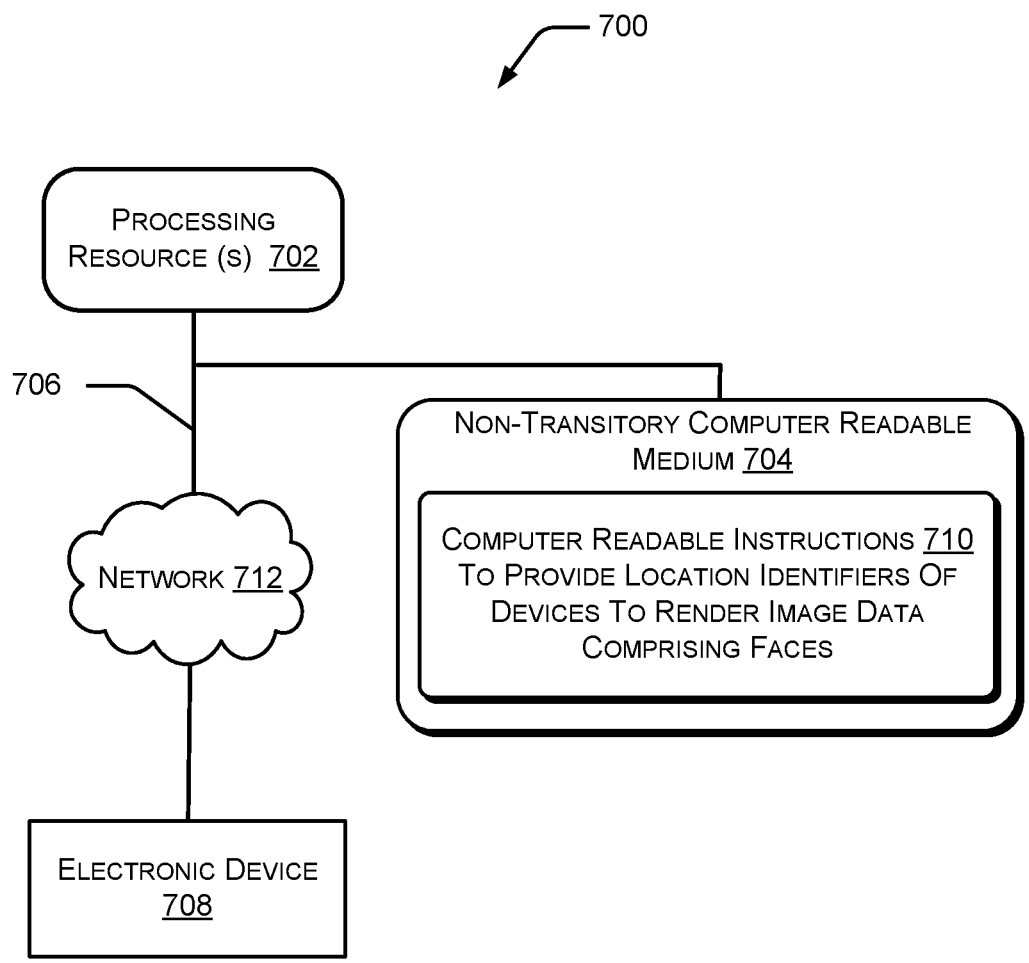
FIG. 7 illustrates a computing environment for rendering image data comprising a face in accordance with privacy instructions associated therewith, according to an example.

FIG. 7 illustrates a computing environment 700 for rendering image data comprising a face in accordance with privacy instructions associated therewith, according to an example of the present subject matter.

In an example, the computing environment 700 includes a processor 702 communicatively coupled to a non-transitory computer-readable medium 704 through communication link 706. In an example, the processor 702 may have one or more processing resources for fetching and executing computer-readable instructions from the non-transitory computer-readable medium 704. The processor 702 and the non-transitory computer-readable medium 704 may be implemented, for example, in electronic devices 102, 200, 300, and 400, such as a printer or a scanner.

The non-transitory computer-readable medium 704 may be, for example, an internal memory device or an external memory. In an example, the communication link 706 may be a network communication link, or other communication links, such as a Peripheral component interconnect (PCI) Express, Universal Serial Bus (USB) interfaces, Inter-Integrated Circuit (I2C) interfaces, etc. The processor 702 and the non-transitory computer-readable medium 704 may also be communicatively coupled to an electronic device 708 over a network 712. The electronic device 708 may be implemented, for example, as electronic devices 102, 200, 300, and 400. In an example, the non-transitory computer-readable medium 704 includes a set of computer-readable instructions 710 to provide location identifiers of devices to render images comprising faces which may be accessed by the processor 702 through the communication link 706 and subsequently executed to provide a location identifier of an electronic device that may render image data comprising a human face.

Referring to FIG. 7, in an example, the non-transitory computer-readable medium 704 includes computer-readable instructions 710 that cause the processor 702 to detect a face to be present in an image data to be rendered by a destination device. Once a face is detected to be present in the image data, the instructions 710 may further cause a contact identifier corresponding to the face to be obtained and a location identifier of the destination device to be provided to the contact identifier. For example, the location identifier may be a serial number of the destination device, a device name of the destination device, an IP address of the destination device, a current location of the destination device, or a combination thereof.

In an example, for obtaining the contact identifier corresponding to the detected face, the non-transitory computer-readable medium 704 may include a set of instructions executable by the processor 702 to identify a user whose face is detected in the image data. Accordingly, the non-transitory computer-readable medium 704 may include computer-readable instructions 710 that cause the processor 702 to extract face descriptors of the detected face from the image data and identify the user corresponding to the detected face by comparing the extracted face descriptors with face descriptors of users stored in a database, such as a database associated with the user identification system explained above.

In an example, the non-transitory computer-readable medium 704 may also include a set of instructions executable by the processor 702 to cause creation of the database that stores face descriptors of users to enable their identification. Accordingly, instructions may be executable by the processor 702 to receive images of faces of the users, extract face descriptors corresponding to each of the users and store the face descriptors in the database. A face detected to be present in the image data may be identified by comparing face descriptors of the detected face to the face descriptors that may be stored in the database. If the face descriptors of the detected face match with any of the face descriptors stored in the database, the user corresponding to the detected face is identified. In an example, the match may be based on a predefined threshold of accuracy. For example, predefined settings, such as configurable settings may define whether, say, a 70% match or a 100% match of the face descriptors is to be considered for identifying the user.

In an example, the database to store face descriptors of users to enable their identification may also store a contact identifier corresponding to each of the users. Accordingly, the computer-readable instructions 710 may cause the processor 702 to procure and store contact identifier corresponding to each of the users in the database, such that upon having identified a user whose face is detected, a contact identifier of the user may be retrieved from the database.

In an example, the instructions 710 may also cause determining if any privacy instructions are associated with the contact identifier. In some examples, the database may comprise privacy instructions corresponding to each of the users and may associate the same with the respective contact identifiers of the users. Accordingly, the instructions 710 may cause rendering of the image data based on privacy instructions associated with the contact identifier of the identified user.

Causing the rendering of the image data to be in accordance with the privacy instructions associated with the contact identifier of the identified user, provides for protecting privacy of the user. Intimation of rendition of the image data by the electronic device enables prevention of unauthorized use of facial images of users and also informs them as to the location of the electronic device that may potentially render such images.

Although examples of providing location identifiers of devices to render facial image data have been described in a language specific to structural features and/or methods, it is to be understood that the appended claims are not necessarily limited to the specific features or methods described. Rather, the specific features and methods are disclosed as examples for providing location identifiers of devices to render image data comprising faces of individuals.

What is claimed is:

1. An electronic device comprising:
a communication engine to:
receive image data to be rendered at a destination device, the image data comprising a face;
a privacy protection engine, coupled to the communication engine, to:
obtain a contact identifier of a user corresponding to the face; and
send a location identifier of the destination device to the user using the contact identifier.

2. The electronic device as claimed in claim 1, wherein the destination device is an imaging device.

3. The electronic device as claimed in claim 1, wherein the location identifier is a serial number of the destination device, a device name of the destination device, an internet protocol (IP) address of the destination device, a current location of the destination device, or a combination thereof.

4. The electronic device as claimed in claim 1, wherein the privacy protection engine is to:
cause the destination device to render the image data based on privacy instructions for rendering the image data associated with the contact identifier.

5. The electronic device as claimed in claim 4, wherein the privacy protection engine is to receive privacy instructions from the user.

6. The electronic device as claimed in claim 4, wherein the privacy instructions are based on the location identifier of the destination device.

* * * * *